3,386,509
PLUGGING HIGHLY PERMEABLE ZONES OF UNDERGROUND FORMATIONS
H R. Froning, Tulsa, Okla., assignor to Pan American Petroleum Corporation, Tulsa, Okla., a corporation of Delaware
No Drawing. Filed Sept. 30, 1966, Ser. No. 583,454
4 Claims. (Cl. 166—29)

ABSTRACT OF THE DISCLOSURE

A highly permeable zone between two wells is plugged by treating the zone at both wells. The treatment of the first well involves injecting a settable liquid at least substantially the entire distance between wells. At least the portion of the settable liquid near the first well forms a strong plug. Then, a strong plug is formed in the zone near the second well by injecting an agent through the second well. The agent may be an activator which sets the liquid injected from the first well, or it may be a batch of settable liquid. Preferably, the first liquid is displaced into the zone until it reaches the second well. Then, the plugging agent injected through the second well displaces the first liquid back toward the first well before any part of the first liquid sets.

---

It has been previously proposed to plug highly permeable zones or streaks such as fractures in a secondary recovery operation, for example, by injecting into such a zone a material which will plug the zone at the injection well. The theory is that this prevents entry of the secondary recovery fluid into the highly permeable zone, forcing the fluid to flow instead through the less permeable portions of the formation. In practice, it has been found that once the secondary recovery fluid passes the farthest extent of the plug, it usually quickly returns to the unplugged portion of the highly permeable zone and flows through this zone to the producing well.

It has even been proposed that the highly permeable zone be plugged to a distance as much as 75 percent or so of the total distance to the producing well. Such operations, however, either involve expensive materials, such as settable organic resins with long delayed setting times, or complex systems involving two solutions which will react to form a plug upon mixing. For example, the two reactive solutions may be separated by a bank of inert liquid, the volume of inert liquid being carefully measured to permit mixing of the reactive solutions at the exact time and location desired. Control of such processes is obviously difficult. Some inexpensive gelling materials such as aqueous sodium silicate solutions can be made to gel after a long time, but in general the longer the delay, the weaker the gel. As a result, the gel which approaches the producing well is generally very weak at a location where high pressure differentials are involved. Movement and loss of the gel may, therefore, take place.

With these problems in mind, an object of my invention is to provide a method for plugging a substantial portion of a highly permeable zone between wells. A more specific object is to provide a method for forming strong plugs near both the wells connected by the highly permeable streak. A still more specific object is to provide a method for forming an inexpensive silica gel plug between the wells, at least both ends of the plug being strong gels.

In general, I accomplish the objects of my invention by treating both ends of the highly permeable zone. In one embodiment, for example, a sodium silicate solution is injected into the zone from one well, a gelling agent, such as carbon dioxide, being injected into the zone from the other well. The first portion of the silicate solution may contain little, if any, chemical such as sodium bicarbonate, ammonium sulfate, or the like, to induce delayed gelling of the solution. Such chemicals which induce gelation are conveniently referred to as activators. The final portion of silicate solution injected into the first well should contain sufficient silicate and activator to form a gel in a short time and, therefore, form a strong plug near the well into which the silicate solution is injected. Treatment of the silicate solution from the other well with a suitable activator then forms a strong plug near the other well also. It is true that the intermediate portion of the plug may be rather weak, but only a weak gel is needed at considerable distances from the wells, since pressure differentials are small in these regions.

Many variations of my process are possible. The one which is preferred depends to some extent on the circumstances. For example, if an open fracture exists between rather closely spaced wells, a fluid injected into one well may appear at the other in only a few hours. In this case, a first gelling solution can be forced the entire distance from a first well to a second well. When the solution is detected at the second well, a second solution, a rather fast-setting gel in this case, can be injected into the second well to force the first solution back toward the first well. After injection of the second solutin, both wells are shut in and the solutions are allowed to set. Since the last portion of the first solution injected into the first well can be a fairly fast-setting gel, and since all of the small batch of solutions injected into the second well is fast-setting, both wells have strong plugs formed in the highly permeable zones near the wells.

An example will be helpful to illustrate this variation of the process. Two wells are spaced about 460 feet apart. They both penetrate an oil-bearing formation about 50 feet thick at a depth from about 3,500 feet to about 3,550 feet. Water injected into one well appears at the other well in about ten hours when injected at a rate of about 3 barrels per minute (42 U.S. gallons per barrel). Four batches of plugging solution are prepared, as shown in Table I.

TABLE I

| Batch | Volume (bbl.) | Weight Percent, $SiO_2$ | Weight Percent, $(NH_3)_2SO_4$ | Setting Time (Hrs.) | Used at Well No. |
|---|---|---|---|---|---|
| 1 | 500 | 6 | 1.47 | 24 | 1 |
| 2 | 500 | 6 | 1.52 | 18 | 1 |
| 3 | 500 | 6 | 1.65 | 8 | 1 |
| 4 | 300 | 6 | 1.79 | 3.5 | 2 |

The batches are not, of course, made up at the same time, but are made up as needed. An iodide tracer is added to the first batch. Batches 1, 2 and 3 are injected in sequence into well 1 and displaced into the high permeability streak with water until the tracer appears at well 2, showing the first batch of silicate has arrived at well 2. Batch 4 is then injected into well 2. This displaces the first 3 batches back toward well 1. After batch 4 has been injected into the formation, wells 1 and 2 are shut in for at least about 24 hours to permit the gel to set. Water is then injected into well 1 to force oil in the formation toward well 2. The gel nearest well 1 sets in about 8 hours and that near well 2 sets in less than 4 hours. Therefore, the gels are relatively strong near the wells, being weaker between the stronger plugs which are near the wells.

It is possible, of course, to inject batches 1, 2 and 3 into the well which will ultimately be the oil-producing well, batch 4 being then injected into what will ultimately be the water injection well. The reverse is preferred, however, since the strongest gel should be near the producing well where the flow is toward the well rather than away from the well. Near the water injection well a weaker gel is satisfactory since it is backed up by gel in the remainder of the fracture. Near the oil-producing well, however, there is nothing except the strength of the plug itself to support the plug against pressure exerted by fluids flowing toward the well. While use of batches with distinctly different setting times is described above, it will be obvious that activator-free silicate solution could be pumped continuously, the activator being blended into this stream in continuously increasing concentration.

In the example given above, the fracture is plugged substantially completely from well to well. It is usually preferred, however, to leave portions of the highly permeable zone open near the wells. This not only decreases pressure differences across the plugs, but also permits increased water injection and oil production rates. In the example, this would mean cutting the sizes of batches 1 and 4 by about 100 barrels each. Then, after batch 4 was injected into the fracture from well 2, it would be followed by about 100 barrels of water. This would leave about 100 barrels of water in the fracture near both wells 1 and 2. The technique overcomes the difficulty that the gel tends to plug the low permeability zones to some extent, as well as the high permeability zones. By leaving the high permeability zones open near the wells, fluids can use this channel to by-pass the plugged portion of the low permeability zones.

As noted above, instead of injecting a settable liquid in the second well, an activator can be used. Thus, either a settable liquid or an activator can be used as the fluid which forms a plug near the second well. For example, when the first batch of silicate solution reaches the second well, a 300-barrel batch of 3 percent ammonium sulfate solution can be injected into the second well. This activator solution mixes with the silicate solution increasing the ammonium sulfate concentration sufficiently to cause the silicate solution to set rapidly and form a stronger plug. Preferably, an acidic gaseous activator, such as carbon dioxide or sulfur dioxide, should be used since gases tend to finger through the silicate solution more effectively to form a longer and stronger plug.

If the formation pressure is above the critical pressure for carbon dioxide or sulfur dioxide, these gases assume the form of a dense phase somewhat unlike either a liquid or a gas. This dense phase is rather highly soluble in both oil and water. The tendency, therefore, may be for the injected carbon dioxide to displace the silicate solution rather than mix with it. The viscosity of the dense phase is quite low, however, so it will finger through the silicate solution better than a water solution, for example, but not as well as a gas. It may be desirable, therefore, to mix the acid gas with an inert gas such as nitrogen, or the like, which is substantially insoluble in the oil and water. The inert gas is present in sufficient quantity, such as about 50 percent to 80 percent by volume of the mixture, to decrease the partial pressure of the acid gas to a value less than its critical pressure. This mixture moves through the formation and penetrates the silicate solution as a gas from which sufficient acid gas diffuses into the solution to form a strong gel.

In the processes described above, a fluid is injected into the second well before the settable liquid injected into the first well has had time to set. It is also possible to allow the liquid injected into the first well to set before any fluid is injected into the second well. For example, the first batch of silicate solution injected into the first well may contain little or no activator. Each following batch contains more activator until the last one sets in only two or three hours. The total volume of the batches is enough to fill the permeable channel from well to well. The wells are then shut in for a day or two to allow all the solutions, except the first batch, to set. Then, an activator is injected into the second well to mix with the first batch of silicate solution and cause this solution to set and form a strong plug. Since a set gel occupies most of the permeable streak, some of the first, unset, batch of silicate solution must be displaced into the formation matrix pores to permit the activator fluid to enter the formation, mix with the silicate solution and form a strong plug. In this variation of the process, a gaseous activator is particularly advantageous. It is well known that in porous media containing oil, water and gas some pores are filled with gas and permit flow of substantially only gas through the formation. Other pores are filled with water and permit flow of substantially only water. Thus, by use of a gaseous activator, it is possible to cause the activator to flow through the formation and contact the aqueous silicate solution with little displacement of the silicate solution into the formation matrix pores.

Insufficient solution to fill the permeable zone from well to well may be injected from one well and may be allowed to set before anything is injected from the other well. The last batch of liquid injected into the first well may be settable or it may be non-setting to leave the permeable streak open near the first well, as described above in connection with another variation of the process. Sufficient settable solution may be injected into the first well to fill from about 50 percent to about 90 percent of the permeable zone, for example. If the settable liquid does not reach the second well, the permeable zone will contain unsettable liquids and possibly gases between the end of the settable liquid and the second well. In spite of the presence of these fluids, it is possible to inject either a settable liquid or an activator into the permeable zone from the second well. If a settable liquid is injected into the second well, this liquid simply displaces into the matrix pores fluids already in the permeable zone. A small amount of permeable zone may be left unplugged between the two plugs injected from the two wells in this technique. If the length of unplugged zone is short, however, only a very small volume of the total secondary recovery liquid will enter this zone, flow through it, and then leave the zone again.

Even this short length of unset liquid can be avoided by a technique using an activator injected from the second well. It is true that the presence of water and oil in the permeable zone near the second well will so decrease the effectiveness of using liquid activators that use of such liquid activators ordinarily is not advisable. As explained above, however, a gas can usually penetrate to a considerable distance from a well without displacing all of the liquids ahead of it. Therefore, by injecting a gaseous activator into the second well, it is possible to strengthen a settable liquid to form a strong plug at a considerable distance from the second well.

Variations are possible in the materials used, as well as in the process steps. For example, the silica concentration can vary widely from the 6 percent described in the example. In general, the weaker the solution, the longer is the setting time, and the weaker is the plug formed by the set solution. In order to avoid undesirably weak plugs, the silica concentration should be at least about 1 percent by weight. To avoid high costs, an upper limit of about 30 percent silica should be observed. For most purposes, a silica concentration in the range from about 3 percent to about 10 percent by weight is preferred. The solutions may contain finely divided solids such as fine sand if desired.

The ratio of silica to sodium oxide in the silicate can also vary within limits from about 1.5 to 1, to about 4 to 1 by weight. Preferably, the ratio should be from about 3 to 1, to about 3.5 to 1.

Potassium silicate can be used in place of sodium silicate, although the greater cost of potassium silicate limits its use. Some of the mixtures of sodium and potassium silicates are sometimes preferred because of the low viscosities of their aqueous solutions.

Aluminates and borates can be substituted for the silicates. Again, however, their greater cost limits their use. Still other settable liquids will occur to those skilled in the art. These may form solids, such as polymerized resins or may simply form gels such as those formed from sodium silicate solutions. The settable liquid should form at least a gel in order to avoid the slow displacement of the plugs which would occur if simply a highly viscous liquid was formed.

The process can be used in recovery methods other than water flooding. For example, the process may be used in connection with gas drive, miscible fluid drive, underground combustion operations, and the like.

Many other variations will be apparent to those skilled in the art. For example, in some cases, it may be preferred to inject silicate and activator solutions in sequence either separated or not separated by inert fluid slugs, rather than pre-mixing the silicate and activator. Since other alternates and changes will be apparent to those skilled in the art, I do not wish to be limited to the examples given above, but only by the following claims.

I claim:

1. A method for plugging a highly permeable zone between two wells comprising injecting into said highly permeable zone through one well a first liquid which will set to form at least a gel after a period of time, displacing said liquid through said zone until said first liquid reaches the other well, and then injecting into said highly permeable zone through said other well a second liquid which will set to form at least a gel after a period of time, said second liquid displacing said first liquid back toward said one well before said first liquid sets, and holding said first and second liquids in said formation until they set to form a plug containing no ungelled material between the materials injected through the two wells.

2. The method of claim 1 in which said first liquid and said second liquid are both sodium silicate solutions containing sufficient of a pH adjusting material to cause said sodium silicate solutions to gel after being placed in said highly permeable zone.

3. The method of claim 2 in which the last portion of said first liquid injected into said formation sets more quickly than earlier injected portions of said first liquid and the second liquid sets at least as quickly as the last portion of said first liquid, whereby the strongest portions of the plug are near the two wells.

4. The method of claim 1 in which both said first liquid and said second liquid are displaced away from the wells with an unsettable liquid in order to preserve the highly permeable zone near the wells for increased flow of fluids into and out of said wells after said highly permeable zone is plugged between said wells.

References Cited

UNITED STATES PATENTS

| | | | |
|---|---|---|---|
| 2,208,766 | 7/1940 | Lawton | 166—30 |
| 2,330,145 | 9/1943 | Reimers | 166—29 |
| 2,402,588 | 6/1946 | Andresen | 166—10 |
| 2,786,530 | 3/1957 | Maly | 166—10 |
| 3,199,588 | 8/1965 | Holbert | 166—33 |
| 3,261,400 | 7/1966 | Elfrink | 166—30 |
| 3,318,380 | 5/1967 | Tenny | 166—29 X |
| 3,331,438 | 7/1967 | Slusser | 166—29 |
| 3,349,844 | 10/1967 | Rhea et al. | 166—9 |

CHARLES E. O'CONNELL, *Primary Examiner.*

I. A. CALVERT, *Assistant Examiner.*